United States Patent [19]

Riedel et al.

[11] 3,892,966
[45] July 1, 1975

[54] INFRARED VIDICON

[75] Inventors: Harold R. Riedel, Adelphi; Kurt Peter Scharnhorst, Beltsville, both of Md.; Sol Nudelman; Hans Roehrig, both of Tucson, Ariz.

[73] Assignee: The United States of America as represented by the Secretary of the Navy, Washington, D.C.

[22] Filed: Jan. 10, 1974

[21] Appl. No.: 433,021

[52] U.S. Cl.............. 250/333; 250/211 J; 250/338; 313/385
[51] Int. Cl. ............................................ H01j 29/18
[58] Field of Search .......... 250/338, 339, 484, 370, 250/213 R, 213 VT, 211 J, 316, 330, 333, 250/342; 357/2, 31; 340/173 LS; 313/385

[56] References Cited
UNITED STATES PATENTS

| 2,131,328 | 9/1938 | Michelssen | 250/338 |
| 2,844,737 | 7/1958 | Hahn et al. | 250/370 |
| 3,054,917 | 9/1962 | Eberhardt | 250/330 |
| 3,360,649 | 7/1967 | Brau et al. | 250/370 |
| 3,659,149 | 4/1972 | Fleming | 250/484 |
| 3,716,844 | 2/1973 | Brodsky | 317/235 NA |
| 3,767,928 | 10/1973 | Bishop et al. | 250/338 |
| 3,794,835 | 2/1974 | Hirai | 317/235 NA |

OTHER PUBLICATIONS

"Optical Memory – –" by Dakss and Sadagopan, IBM Technical Disclosure, June 1970, Vol. 13, No. 1, p. 96.

Primary Examiner—Harold A. Dixon
Attorney, Agent, or Firm—R. S. Sciascia; J. A. Cooke; W. W. Cochran

[57] ABSTRACT

A device for producing a visible picture of an infrared scene by means of a vidicon-type television camera based on an amorphous film vidicon target sensitive to infrared light out to wavelengths in the vicinity of two microns.

2 Claims, 1 Drawing Figure

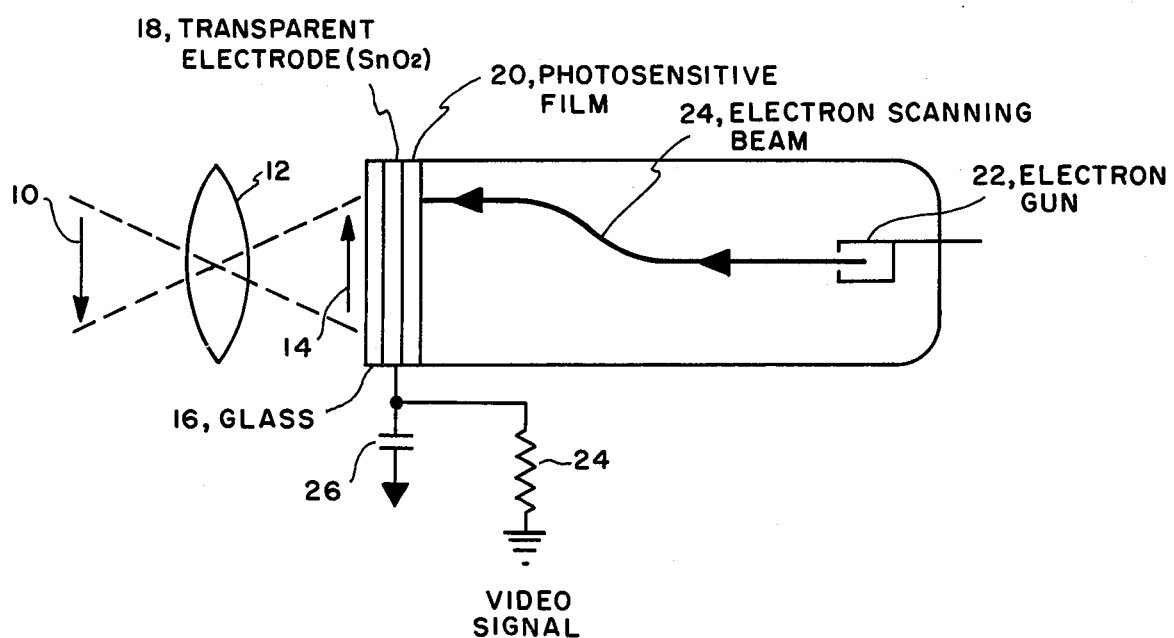

3,892,966

INFRARED VIDICON

BACKGROUND OF THE INVENTION

This invention relates generally to radiant energy and more specifically to detection and imaging of infrared radiation on an infrared sensitive vidicon tube.

In the field of infrared detection it has been the general practice to employ semiconductor photodetector scanning devices and photomultiplier tubes to form images of infrared scenes. Photomultiplier tubes have been found extremely effective at wavelengths less than about $1.2\mu$. Photomultiplier tubes, however, are essentially useless for viewing infrared radiation which falls in the range of $1.6\mu$ where an atmospheric window or unimpeded region for viewing reflected infrared radiation exists. The primary purpose of viewing infrared radiation in the $1.6\mu$ window is to penetrate haze during daylight conditions for surveillance, guidance, and target aquisition and tracking at ranges from 10 to 100 miles. Infrared radiation in the above mentioned atmospheric window is less sensitive to the scattering of the fine suspension of water particles constituting the haze. In fact, contrasts obtainable at these infrared wavelengths are sometimes as much as 11 times greater than that obtainable by visible light.

To view radiation in the $1.6\mu$ atmospheric window, various scanning systems have been developed using semiconductor type photodetectors which are responsive to infrared radiation having wavelengths as great as and greater than $1.6\mu$. The principle disadvantage of these types of scanning systems is that they are inherently complex and expensive. This results from various mechanical parts associated with the scanning system of these devices which must be moved at an extremely high rate of speed; at least equal to or greater than the flicker/fusion rate of the eye. In addition, each individual detector must be made to have a uniform response so that a uniform image is produced resulting in further expense. Also, each detector requires its own separate electronic circuitry for operation which adds both to the expense and complexity of the system.

Other systems for viewing infrared indication of the wavelength have attempted a simpler method employing conventional vidicon (TV) scanning tubes treated with polycrystalline low density deposits which are sensitive to infrared light. However, these require delicate sensitization and surface treatments. Furthermore, the individual crystals of the polycrystalline material tend to react differently to incident radiation creating an inhomogeneous response resulting in degraded picture quality.

SUMMARY OF THE INVENTION

The present invention overcomes the disadvantages and limitations of the prior art by providing an amorphous film vidicon tube. The present invention produces a visible picture on a monitor of an infrared scene by means of a vidicon type television camera based on an amorphous film vidicon target sensitive to infrared light out to wavelengths in the vicinity of two microns.

It is therefore an object of the invention to provide an improved vidicon tube.

It is also an object of the invention to provide a vidicon tube which is sensitive to radiation having wavelengths as long as two microns.

Another object of the invention is to provide a simple device for imaging infrared scenes at wavelengths as long as 2 microns.

A further object of the invention is to provide an inexpensive device for imaging infrared scenes at wavelengths as long as 2 microns.

Still another object of the invention is to provide a device for imaging infrared scenes at wavelengths as long as two microns which has a homogenous response.

Other object, advantages and novel features of the invention will become apparent from the following detailed description of the invention when considered in conjunction with the accompanying drawings wherein:

BRIEF DESCRIPTION OF THE DRAWING

The sole FIGURE is a diagram of the vidicon tube comprising the present invention.

DETAILED DESCRIPTION OF THE PREFERRED EMBODIMENT

The FIGURE is a side view of a vidicon tube constituting the preferred embodiment of the invention. As shown, the object 10 is projected onto the glass face 16 of the vidicon tube by lens 12 to form an image 14. A standard transparent electrode 18 usually consisting of $SnO_2$ is used to coat the glass plate 16 as in conventional vidicon tubes. An amorphous film of germanium telluride (GeTe) 20 is vacuum evaporated from a heated source of GeTe powder onto the transparent electrode substrate 18 held somewhat above room temperature (tens of degrees centigrade).

Thus the apparatus consists of a rather standard self contained vidicon tube with a special photosensitive film of GeTe used to coat the conventional electrode such that the apparatus becomes sensitive to radiation having wavelengths as long as two microns. The GeTe coating is unique in of itself in that it is truly amphorous and near crystalline density. The advantage of such a film is that it is rather easily made, requires no oxidation treatments, and tends to be uniform both in photosensitive response and thickness due to its amphorous structure as opposed to a polycrystalline structure where each crystal seems to have a slightly different response.

Obviously many modifications and variations of the present inventions are possible in light of the above teachings.

For example, somewhat different materials should also be applicable, for instance $(Pb_yGe_{1-y})_xTe_{1-x}$ where $x$ and $y$ can be varied until the crystallization temperature (temperature where the amorphous material crystallizes) is outside the operating range. More generally, various combinations of Pb, Sn, Ge, Te may be applicable.

Alternatively, different methods of preparing the amorphous films could possibly be employed, for instance, a standard sputtering method.

It is therefore to be understood that within the scope of the appended claims the invention may be practiced otherwise than as specifically described.

What is claimed as new and desire to be secured by Letters Patent of the United States:

1. A vidicon tube for producing an electronic video signal representative of detected radiation having wavelengths shorter than two microns comprising:
   transparent support means disposed along one end of said tube for transmitting said radiation;

transparent electrode means deposited on said transparent support means for conducting said electronic video signal;

a homogeneous layer of amphorous $(Pb_yGe_{1-y})_xTe_{1-x}$ with $0<x<<1$ and $0<y<1$ and $x$ and $y$ selected such that the crystallization temperature of said homogeneous layer is outside the operating temperature of said vidicon tube and said homogeneous layer remains amorphous during operation;

wherein said homogeneous layer is deposited on said transparent electrode means for photoconductively producing said electronic video signal in response to, and representative of, said radiation having wavelengths shorter than two microns transmitted through said transparent support means.

2. A vidicon tube for producing an electronic video signal representative of detected radiation having wavelengths shorter than two microns comprising:

transparent support means disposed along one end of said tube for transmitting said radiation;

transparent electrode means deposited on said transparent support means for conducting said electronic video signal;

a homogeneous layer of amorphous $(Sn_yGe_{1-y})_xTe_{1-x}$ with $0<x<1$ and $0<y<1$ and $x$ and $y$ selected such that the crystallization temperature of said homogeneous layer is outside the operating temperature of said vidicon tube and said homogeneous layer remains amorphous during operation;

wherein said homogeneous layer is deposited on said transparent electrode means for photoconductively producing said electronic video signal in response to, and, representative of, said radiation having wavelengths shorter than two microns transmitted through said transparent support means.

* * * * *